UNITED STATES PATENT OFFICE.

PAUL SCHOOP, OF ZÜRICH, SWITZERLAND.

METHOD OF GELATINIZING ELECTROLYTES FOR GALVANIC BATTERIES.

SPECIFICATION forming part of Letters Patent No. 408,138, dated July 30, 1889.

Application filed March 30, 1889. Serial No. 305,443. (No model.)

*To all whom it may concern:*

Be it known that I, PAUL SCHOOP, a citizen of the Republic of Switzerland, residing at Zürich, in the Republic of Switzerland, have invented certain new and useful Improvements in Galvanic Piles, (which has not been patented to myself or to others with my knowledge or consent in any country,) of which the following is a specification.

The invention relates to improvements in galvanic batteries or piles, the object being to develop a process whereby the electrolyte or electrolytes used in such a battery or pile may be stiffened and rendered gelatinous, rendering thereby possible the use of very porous electrodes—such as spongy zinc or lead—which electrodes can be easily kept apart by the stiffened or gelatinized electrolyte, and two electrolytes can be kept separate without the use of porous cells.

The invention consists of the steps hereinafter described, and pointed out in the claims.

The electrolyte is usually an acid, a diluted acid, or the solution of a salt, but in some cases is alkaline, and when two electrolytes are used porous cells should also be used to separate them. The porous cells, moreover, separate the electrodes. The electrodes are preferably of the metals commonly used for this purpose—such as platinum, iron, nickel, &c.—or of plates of any suitable material covered with a powder of said metal or metals, the said covering being the true electrode.

The invention is applicable both to batteries in which the products disengaged at the pole by the electric current (which products are called "ions") are merely precipitated on the electrodes, or those in which the said ions combine chemically with a part of the material of the electrodes, though it is preferable to use electrodes of a material that will not be so acted on by the electrolyte.

When diluted sulphuric acid is used as an electrolyte, water-glass is added in proper proportions to gelatinize the same or convert it into a jelly-like mass sufficiently stiff to keep apart the electrodes, and also the electrolytes when there are more than one, doing away with the use of porous cups or partitions, and equally well conveying the currents between the electrodes and not increasing the resistance thereto. When a solution of sulphate of ammonia (sal-ammoniac) is used as an electrolyte, the water-glass is also added for the same purpose; but it is preferable to add a certain but not exactly determined quantity of a mineral acid, such as sulphuric acid.

In an alkaline electrolyte a proper quantity of the sulphate of alumina is added to water-glass to produce the gelatinous mass desired. The said water-glass is prepared from quartz, the carbonates of soda and of potassa, and charcoal, which materials are powdered, mixed in proper proportions, and fused together for a certain time.

The invention is alike applicable to primary and secondary batteries, and zinc in a spongy state is preferably used as a negative electrode and the peroxide of manganese as a positive electrode, the electrolyte being, preferably, a mixture of water-glass, solution of sulphate of ammonia, and a little diluted sulphuric acid, each at a specific gravity of about 1.2, (one and two-tenths.) When the said mixture has assumed the gelatinous state, or become stiff, it is covered with a coating of wax or paraffine.

Instead of the peroxide of manganese, other peroxides—such as those of copper, cobalt, or lead—may be used in connection with a metal or other substance that will act therewith as a negative electrode.

Having thus fully described my invention, what I claim as new, and desire to secure by Letters Patent, is—

1. The herein-described method of converting the electrolyte of a galvanic battery or pile into a gelatinous mass by the addition to said electrolyte of a sufficient quantity of water-glass, substantially as specified.

2. The herein-described method of converting the electrolyte of a galvanic battery or pile into a gelatinous mass by adding to said electrolyte a sufficient quantity of water-glass and a mineral acid, (such as sulphuric acid,) substantially as specified.

3. The herein-described method of converting the electrolyte of a galvanic battery or pile into a gelatinous mass by the addition thereto of a sufficient quantity of water-glass and the sulphate of alumina, substantially as specified.

4. The herein-described method of preparing the electrolyte of a galvanic battery or pile by converting said electrolyte into a gelatinous mass by the addition thereto of sufficient quantities of water-glass and a mineral acid (such as sulphuric acid) and covering or coating said mass with a bland soft material, such as wax or paraffine, substantially as specified.

In testimony whereof I have signed this specification in the presence of two subscribing witnesses.

PAUL SCHOOP.

Witnesses:
EMIL BLUM,
L. LUDMANN.